April 4, 1950 P. HALPERT 2,502,721
INSTRUMENT LANDING INDICATOR
Filed July 2, 1945 2 Sheets-Sheet 1
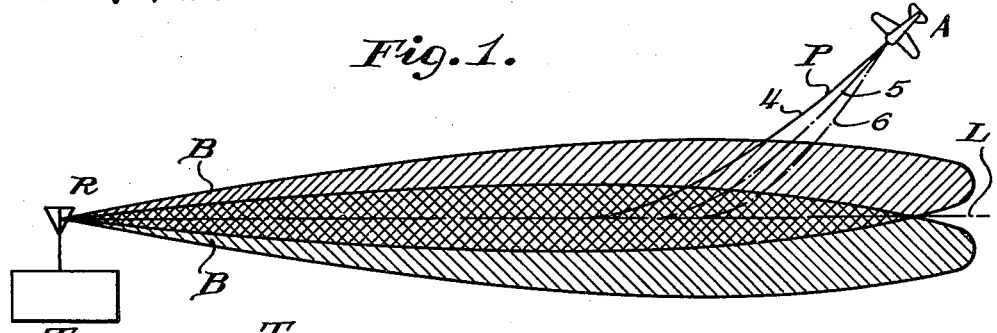
Fig. 1.
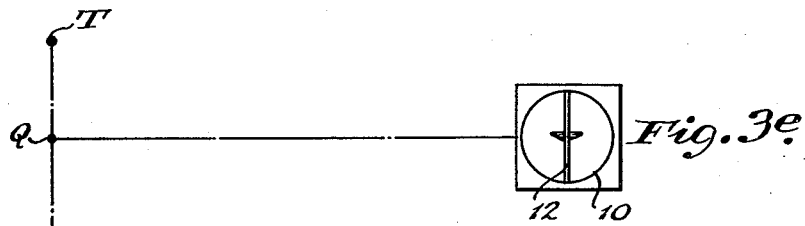
Fig. 3.
Fig. 3e.
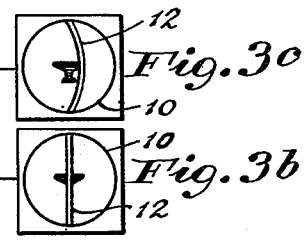
Fig. 3d.
Fig. 3c
Fig. 3b
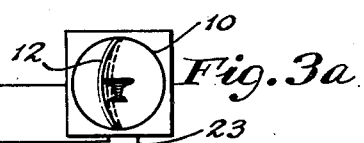
Fig. 3a.
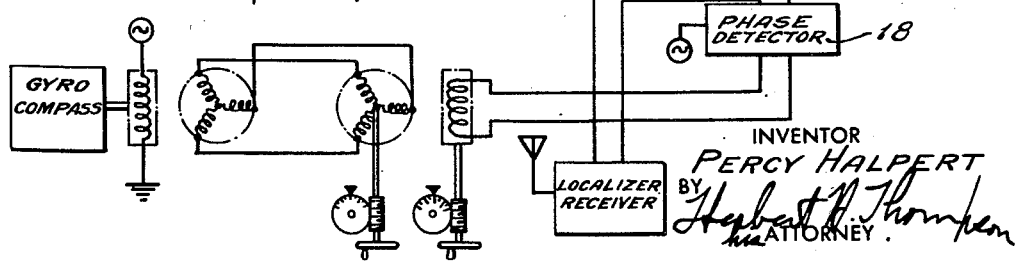
INVENTOR
PERCY HALPERT
BY Herbert N. Thompson
his ATTORNEY.

April 4, 1950
P. HALPERT
2,502,721
INSTRUMENT LANDING INDICATOR
Filed July 2, 1945
2 Sheets-Sheet 2
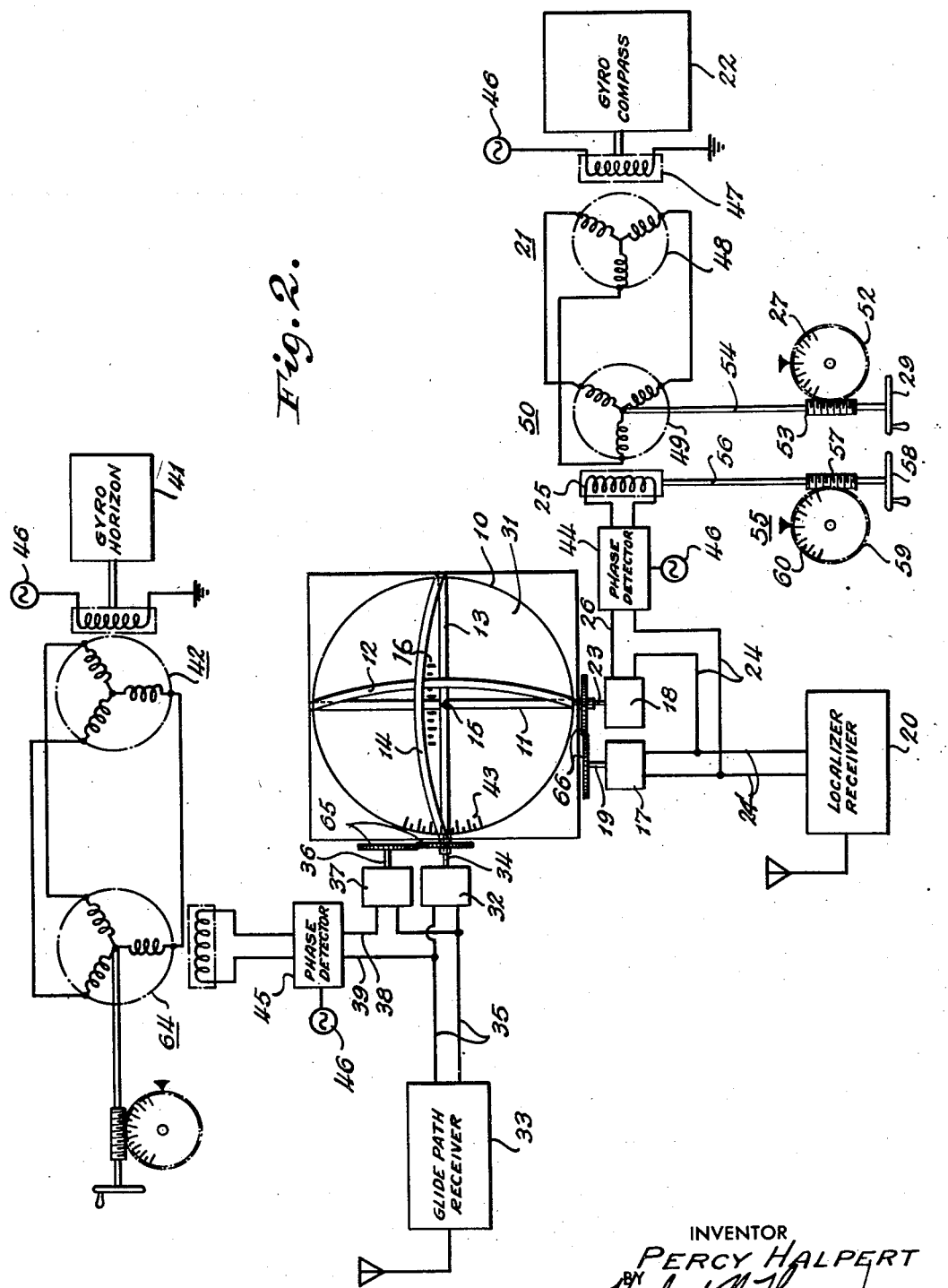
INVENTOR
PERCY HALPERT
BY Herbert P. Thompson
his ATTORNEY.

UNITED STATES PATENT OFFICE 2,502,721

INSTRUMENT LANDING INDICATOR

Percy Halpert, Hempstead, N. Y., assignor to The Sperry Corporation, a corporation of Delaware Application July 2, 1945, Serial No. 602,845

22 Claims. (Cl. 177—352)

This invention relates to navigational systems for indicating the proper approach of a craft to a predetermined line of flight under adverse weather conditions including poor visibility or cross-winds or both.

Although the invention may be adapted for use with various types of land vehicles and marine vessels, the invention is particularly applicable to aircraft and for convenience is herein described as applied thereto.

There are at present several general types of systems employed or known for guiding aircraft toward or from a given point. Each system contains devices including meters for giving such information as position of the craft with respect to a desired location and attitude or heading. Some systems are adapted to give only the positional aspect while others give the various attitudes of the craft, and still other systems provide all the information above, but presented in an uncorrelated manner. Furthermore, the sum total of the information obtained from these systems proved to be insufficient, especially under adverse weather conditions.

Attitude and positional error signals may be derived by various means such as a magnetic compass, a directional gyroscope, which may or may not be slaved to a magnetic compass, and is referred to herein as a gyroscopic compass, and a radio guidance means or course finder. While any means for producing an attitude indication (using this term in the broad sense of attitude about both horizontal axes and in azimuth or heading) may be employed in navigational systems according to the present invention, the invention will be described in this application particularly in connection with a gyroscopic compass (as above defined) and a gyro horizon.

The radio guiding means or the radio course finder, referred to and by which is provided an indication of the position of the craft with respect to a definite and known course or desired line of flight in space, is particularly exemplified by the range beacon system now in use. These beacons, which are generally of the well-known overlapping beacon or equisignal type, operate to provide an equisignal zone defining a course in space having its origin at the transmitting point. The equisignal receiver may be of the aural or visual type and in either case means are provided on the aircraft for indicating either aurally or visually the position of the aircraft with respect to the established course. Other types of directional beacons are known and are adaptable to the present invention provided only that the beacon radiations will operate means on the aircraft giving an indication of the position of the aircraft with respect to the course.

It is therefore proposed by the present invention to display on a single flight instrument representations which will give to the observer in a craft both the craft's displacement from a desired course or flight path and an indication of its direction or heading or attitude relative to a given course, the representations being also correlatable with themselves and definite markings on the instrument so that a measure of the craft's drift may be obtained when a cross-wind exists, whereby such adverse condition can be overcome. The necessary instrumentalities and electrical circuits in the system including this instrument also accrue to this proposal.

One of the objects of this invention is to provide a plurality of indications on a single flight instrument, one indication being a combination of the directional and positional aspects of the craft and another indication being of the positional aspects of the craft.

A feature of this invention is a navigation instrument for indicating displacement of a craft from a predetermined path and its angular drift caused by cross-winds.

A further object of this invention is to provide means and apparatus for producing the combined indications referred to.

Other objects of this invention are to provide a navigation instrument denoting when a craft is making a proper asymptotic or curvilinear approach to a given course, even when subjected to a cross-wind; to provide an indication of crab angle when the craft remains displaced from its desired line of flight a reasonable length of time; to provide a left-right meter and means for adding a displacement function to an attitude deviation function to produce the flight indication presented for the pilot when the craft approaches its course under a cross-wind; to provide an instrument sensitive to either or both displacement from course and deviation from the desired heading; to provide a navigation instrument which designates the displacement of a craft from its course, which instrument is controlled also by the addition of displacement from course and attitude deviation from the desired heading as the craft approaches its course.

The invention in another of its aspects relates to novel features of the instrumentalities described herein for achieving the principal objects of the invention and to novel principles employed in those instrumentalities, whether or not these features and principles are used for the said principal objects.

These and other objects of the invention will become more apparent from the following description and from the accompanying drawing describing various embodiments of the present invention.

In the drawing,

Fig. 1 is a diagram of a radio beacon or course formed by the line of symmetry of two partially overlapping lobes of directive radiation patterns or beams;

Fig. 2 is a diagrammatic view of a navigation instrument as a cross-pointer meter together with receiving equipment, adapting the meter to indicate the angle of drift as well as craft attitude and positional deviation from a predetermined line of flight;

Fig. 3 is a diagram illustrating the visual indication afforded the pilot when only the combination pointer of the pair of directional pointers is employed, Figs. 3a–3e thereof showing typical positions of said pointer during the return of the craft to its radio course after displacement therefrom.

Generally speaking, the invention comprises an improved flight instrument with its associated electrical system for guiding craft along a predetermined path to a destination point whether or not a cross-wind exists. The flight instrument may be a meter such as a cross-pointer meter having two single indicators or preferably two pairs of indicators, each pair being normally symmetrically aligned with a zero index under the condition of the craft being on a predetermined line of flight. Each pair of indicators (or single indicator) is separated by a convenient angle, preferably 90° and being in substantially horizontal and vertical planes respectively. Indicators such as pointers or bars in the vertical plane are motivated by signals generated for the horizontal guidance of the aircraft, while indicators in the horizontal plane are motivated by similar signals generated for the vertical guidance of aircraft. One indicator, positioned in the vertical plane moves in accordance with the strength and location of received positional signals from the radiant energy of a localizer beam. The other indicator in this plane is responsive to the aforesaid alegbraic sum of the positional signals and the signals from a direction giving instrument such as a magnetically slaved gyroscopic compass or magnetic compass. This indicator may conveniently be called a combined indicator. A scale is placed near one of the indicators, preferably the positional indicator, so that when the craft azimuthal attitude is changed to bring the positional indication to a fixed reading indicative of, at least, craft travel parallel with the course beam, the displacement of this positional indicator from zero is an indication of the drift angle and its amount may be ascertained by using the scale as a guide. Other ways of obtaining the drift angle are conceivable with the present system under certain recognized conditions of flight.

A similar arrangement is followed for the horizontally disposed indicators. A craft vertical positional indicator is motivated by well-known glide path signals, while an associated combined indicator is moved by combined glide path signals and signals from a gyro horizon or other similar device. A scale similar to the crab angle scale can be used with these indicators also. The drift or crab angles determine for the pilot what craft attitude compensation must be made to overcome a cross-wind.

Referring now more particularly to the drawings, Fig. 1 discloses in diagrammatic form a transmitter T having a radiator system R adapted to project beams of electromagnetic energy conventionally represented by lobes B, the axis of symmetry of equal strength signals defines the course L along which the craft is to travel. The respective beams B comprise directivity patterns of electromagnetic energy usually diverging slightly in either the horizontal or the vertical planes, according to the use to which the system is to be put. For example, if the invention is applied to instrument landing, the lobes may extend one above the other so that the course or desired line of flight L is disposed at an angle of the order of a few degrees to the horizontal landing field. If the system is to form a radio range, the respective beams are separated in a horizontal plane with the course L oriented properly in azimuth according to the desired direction of the course. The energy detected from the respective beams provides a neutral or balanced signal when the energy is received along the course L, but any deviation from the course results in an unbalanced condition producing corresponding displacement signals in the aircraft receiver, which signals are a function of the displacement of the craft from the course L at any given distance from the transmitter T.

Various approaches to a course or predetermined line of flight are diagrammatically illustrated in Fig. 1. The problem is to have the aircraft A approach the desired line of flight L in such a manner that the craft motion follows the direction of the desired line of flight L when the craft reaches same without overshooting or hunting. The aircraft accordingly should follow a curved, preferably asymptotic path P designated in Fig. 1 by the solid line 4 or by the broken lines 5 and 6 when different angles of approach are desired.

In Fig. 2 there is shown a schematic diagram of an embodiment of the present invention arranged for lateral and vertical guidance. The indicating instrument for this guidance system is a special indicator 10 having four pointers, 11, 12, 13 and 14 and four driving elements such as moving-coil galvanometer driver units 17, 18, 32 and 37 respectively associated therewith. Preferably, units 17, 18, 32 and 37 may be arranged within the casing of meter 10, but for clarity of illustration these driving units are shown externally, units 18 and 32 being schematically shown directly connected to combined pointers 12 and 13 respectively and units 17 and 37 being schematically shown coupled to positional pointers 11 and 14 through gear systems 66 and 65, respectively. Pointer 12 may be distinguished from pointer 11 e. g. in color or breadth, and pointer 14 similarly may be distinguished from pointer 13. As indicated in Fig. 3, only the combined pointers 12 or 14 need be used in the instrument in its simplest form.

A radio instrument landing localizer receiver 20 is provided with its reversible-polarity output voltage circuit connected directly to galvanometer unit 17 for deflecting pointer 11 laterally according to lateral displacement of the craft from the radio instrument landing path. A radio instrument landing glide path receiver 33 similarly is provided with its reversible-polarity output voltage terminals connected directly to galvanometer unit 32, for deflecting pointer 13 upwardly or downwardly according to displacement of the craft below or above the instrument landing path.

As an important feature of the present invention, an arrangement is provided for actuating pointer 12 according to the relative magnitudes and directions of lateral displacement of the craft and yaw or heading departure, i. e., according to the comparison between lateral positional displacement and yaw. For this purpose, galvanometer driver unit 18 is connected to the series-opposed output circuits of the localizer receiver 20 and a phase detector 44 arranged to provide a reversible polarity output voltage varying according to variations of the heading of the craft from a heading corresponding to the instrument landing path direction. A compass or other heading reference device 22 is coupled as through Selsyn units 21 and 50 for supplying to one input circuit of phase detector 44 an alternating voltage of reversible phase and variable magnitude dependent upon the craft heading. A common alternating voltage source 46 supplies the rotatable single winding 47 of the transmitter Selsyn 21 and also supplies the phase reference input circuit of the phase detector 44.

Both of the relatively rotatable portions of the second Selsyn unit 50 are provided with rotatable controllers, the multi-winding portion 49 being controlled by a manually rotatable element 29, and the single-winding portion 25 being controlled by the manually controllable element 58. Selsyn unit 50 is connected as a "signal generator" Selsyn for producing an output voltage varying according to the algebraic sum of the relative angular displacement between rotor 47 and stator 48 in Selsyn transmitter 21 due to rotation of the primary 47 by the compass 22, and the relative angular disposition between winding units 25 and 49 at a given setting of elements 58 and 29.

Pointer 14 similarly is provided for upward and downward deflection according to the relative magnitudes of the craft vertical displacement detected by receiver 33 and the pitch of the craft from a predetermined inclination of the craft longitudinal axis. For this purpose, a stable reference instrument such as a gyro horizon 41 is provided with a Selsyn transmitting system 42, 64, the transmitter Selsyn 42 being coupled to unit 41 about the pitch axis, and the output voltage from signal generator Selsyn 64 is compared in a phase detector 45 with the reference phase voltage from the transmitter Selsyn energizing source 46. The output of the phase detector 45 is connected to driver unit 37 in opposition with the output of receiver 33, for actuating pointer 14 according to the algebraic difference between the output voltages of the phase detector 45 and receiver 33.

The connections of the glide path receiver 33, the phase detector 45 and galvanometer unit 37 are arranged to leave pointer 14 neutrally positioned when the craft pitch and position are interrelated either for ideal progress with respect to the landing path, or for the most expeditious approach to the path. Craft travel along the path with pitch attitude conformal thereto, the ideal condition for flight along the radio landing path, results in zero voltage output from units 33 and 45; while a steeper glide inclination of the craft when displaced above the path, or a lesser glide inclination of the craft when beneath the path results in opposed outputs of units 33 and 45, leaving pointer 14 neutrally positioned. The voltage output of glide path receiver 33 being approximately proportional to displacement from the path, and the voltage output of phase detector 45 being approximately proportional to the extent of angular departure of the craft longitudinal axis from the normal pitch attitude for progress along the glide path, the pointer 14 remains neutrally positioned or zeroed so long as the craft pitch is regulated properly for providing and maintaining descent along the landing path, and for asymptotic convergence therewith. In other words, in using this indicator, all that the pilot need do is to keep the combined indicator centralized or zeroed, for the reasons more fully explained hereinafter in connection with Figs. 3a–3e.

Similarly, the connections of the localizer receiver 20 and the heading error phase detector 44 with galvanometer pointer actuator unit 18 are such as to hold pointer 12 neutrally positioned when the craft is in the vertical plane defined by the instrument landing localizer system and the heading of the craft is aligned therewith. Moreover, this pointer is neutrally positioned or zeroed if the craft is displaced laterally from the landing path and the heading of the craft is toward the localizer vertical plane at an angle proportional to positional displacement therefrom by the predetermined proportionality factor for ideal convergence to the path.

From the foregoing it will be apparent that although combined pointers 12 and 14 do not in themselves give fully complete information as to the craft's progress, the information given is extremely useful in the guidance of an aircraft, and may thus be used without the positional pointers 11 and 13. Pointers 11 and 13, being actuated merely according to displacement of the craft from the path, supplement the action of pointers 12 and 14 in such a way as to complete the information presented to the pilot and to give unambiguous indication of the craft progress.

Considering the pointer conditions displayed in Fig. 2, pointers 11 and 13, being neutrally positioned, intersect in a point at the center of the presentation screen or dial 31, in register with center mark 15, (also acting as the zero index for pointers 12 and 14) and indicate that the craft is in the landing path. Pointers 12 and 14, being rightwardly and upwardly deflected respectively, intersect in a point diagonally upward and to the right of the center, indicating that the attitude of the craft is incorrectly adjusted for progress along the path, in that the nose of the craft is too high and too far to the right. Without the elements of information afforded by pointers 11 and 13, this diagonal displacement of the intersection point of pointers 12 and 14 could be applicable to a condition with the craft momentarily in the glide path, but having an incorrect heading or displaced therefrom. The neutral position of the intersection point of pointers 11 and 13 at 15 resolves the ambiguity which otherwise would be present, and together with pointers 12 and 14, gives the pilot the information that the craft is momentarily in the path but the heading and attitude is such as to lead to departure above and to the right of the path.

Vertical and horizontal scales 43 and 16 may be provided if desired, scale 16 being suitable for estimating cross-wind drift of the craft by its relation to the localizer displacement pointer 11.

Positions of pointer 12 according to various conditions of displacement and craft heading are indicated in Fig. 3. The craft first appears at position A, displaced appreciably to the right from the localizer path L defined by transmitter T, and the craft heading is divergent to the right from a direction parallel with the landing path. Under these conditions, the pointer 12 is deflected sharply to the left by the combined action of the momentarily aiding outputs of the localizer receiver 20 and phase detector 44 (Fig. 2). Even if the craft heading were parallel to course L, as in the dotted outline S, the pointer 12 still would be deflected to the left, but to a lesser extent, the signal actuating pointer 12 then being solely the localizer-receiver output voltage. The pointer 12 would occupy the intermediate-deflection position as indicated in dotted line in the miniature representation at Fig. 3a of the meter 10.

Upon noting the deflection of the pointer 12 sharply to the left, the pilot turns the craft leftward, continuing the turning until the pointer 12 reaches mid-position as indicated in Fig. 3b, i. e., until the signal from the compass balances the localizer signal. The craft has now reached a heading converging with the localizer course at the proper angle for returning thereto. At this time, the yaw of the craft from the heading parallel to path L is properly related to the extent of lateral displacement from path L, and the output signals from units 20 and 44 are balanced, with zero net voltage applied to galvanometer unit 18, and hence with pointer 12 neutrally positioned.

If maintained indefinitely, the heading at J would bring the craft along line K to intersect the localizer path at point N and pass on to the left of the path. This would require an attempt to turn to the right, and successive recrossings of the path would result. Such "hunting," i. e. failure to bring the craft course into convergence with the fixed path L, would be very unsatisfactory, and could lead to disaster. With the present invention, as the craft approaches the path L, the output voltage from receiver 20 decreases, and the output voltage from phase detector 44 tends to exceed the displacement voltage from receiver 20, with pointer 12 tending to move to the right of center. The pilot modifies his heading slightly to the right as required to keep pointer 12 in neutral position, and through this procedure brings the craft along a generally asymptotic approach for convergence with the localizer path L in the region O. The instrument view at Fig. 3c shows the position of pointer 12 which would result from persistent flight along line K, while that at 3d shows pointer 12 neutrally positioned with flight directly along the path. This neutral position prevails for continued craft progress along the path, as indicated in section OQ of the diagram in Fig. 3, and as shown at Fig. 3e.

The present invention also provides a windage allowance feature in that the pilot, having first set control element 29 according to the dial 27 for the heading of the localizer guidance path runway direction, and having thereafter carefully manipulated the craft controls in such a way as to retain pointer 12 neutrally positioned, may find that pointer 11 remains deflected laterally from the neutral position, e. g., deflected slightly to the leftward. Such a condition indicates a prevailing cross-wind from the pilot's left retaining the airplane displaced to the right of the path. Under such circumstances, the pilot, in responding to pointer 12, has retained the heading of the craft slightly to leftward of the heading corresponding to the localizer direction, to such an extent as to cause equality of the output voltages from localizer receiver 20 and phase detector 44 and hence zero net voltage at the input terminals at the galvanometer unit 18.

Upon the continued observation of this condition of pointer 11 displaced to leftward, the pilot adjusts element 58 to such an extent as to deflect pointer 12 into juxtaposition with pointer 11, and then in accordance with the new position of pointer 12, he readjusts the heading of the craft further to the left to bring pointer 12 back to the neutral position. Continued flight according to pointer 12 now results in movement of the pointer 11 over to the neutral position, indicating that the craft displacement from the landing path has been overcome. The pilot now may read on scale 60 the extent of the heading alteration which was required by the cross-wind, i. e. the "crab angle" for flight along the path defined by the radio system.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An instrument landing indicating system for a craft, comprising signal responsive dual exhibiting means for producing exhibitions in normally vertical relation, means for supplying a signal corresponding to craft displacement from a predetermined path of travel to a first one of said exhibiting means, and means for supplying a signal corresponding to the algebraic sum of magnitudes dependent upon said displacement and deviation from a predetermined craft heading to a second one of said exhibiting means.

2. A flight indicating system comprising signal responsive dual movable arms in normally vertical relation, means for supplying a signal corresponding to craft displacement from a predetermined path of travel to a first one of said movable arms, and means for supplying a signal corresponding to the algebraic sum of magnitudes dependent upon said displacement and deviation from a predetermined craft heading to a second one of said movable arms, and indicia located in relationship to said first movable arm for indicating under the condition of no relative movement thereof the approximate drift angle.

3. An instrument landing indicating system for a craft, comprising an indicator having electrically deflectable dual exhibiting means for producing exhibitions means for supplying an electrical signal corresponding to craft displacement from a predetermined path of travel to a first one of said exhibiting means, and means for supplying an electrical signal corresponding to the algebraic sum of electrical magnitudes dependent upon said displacement and deviation from a predetermined craft heading to a second one of said exhibiting means.

4. A flight indicating system for a meter having dual movable arms for producing exhibitions on the face of said meter in normally horizontal symmetrical relation, means for supplying a signal corresponding to vertical craft displacement from a predetermined path of travel to a first one of said movable arms, means for supplying a signal corresponding to the algebraic sum of electrical magnitudes dependent upon said displacement and deviation from a predetermined craft pitch to a second one of said movable arms, and indicia located in relationship to said first movable arm for indicating under condition of no relative movement thereof the approximate correction in pitch of said craft necessary to attain said predetermined path.

5. An instrument landing indicating system for a craft, comprising electrically deflectable dual exhibiting means for producing exhibitions in normally vertical relation, means for supplying a signal corresponding to craft displacement from a predetermined path of travel to a first one of said exhibiting means, means for supplying a signal corresponding to the algebraic sum of electrical magnitudes dependent upon said displacement and deviation from a predetermined craft heading to a second one of said exhibiting means, and a zero index means located adjacent one of said exhibiting means for alignment with said exhibiting means under the condition of the craft being in a desired attitude and position.

6. An instrument landing indicating system for a craft, comprising an indicator having electrically deflectable dual exhibiting means for producing exhibitions on the face thereof in normally horizontal symmetrical relation, means for supplying a signal corresponding to craft vertical displacement from a predetermined glide path of travel to a first one of said exhibiting means, means for supplying a signal corresponding to the algebraic sum of electrical magnitudes dependent upon said displacement and deviation from a predetermined craft glide attitude to a second one of said exhibiting means, and a zero index means located adjacent one of said exhibiting means for alignment with said exhibiting means under the condition of the craft being in a predetermined attitude and position.

7. A flight indicating system for a craft comprising a meter having movable arms in pairs for producing two groups of exhibitions on the face of said meter, the first group being associated with the heading and lateral position of the craft, the second group being associated with the pitch and height of the craft, means for supplying a signal corresponding to craft horizontal displacement from a predetermined path of travel to a first one of said movable arms of said first group, means for supplying a signal corresponding to the algebraic sum of magnitudes dependent upon said displacement and deviation from a predetermined craft heading to the other movable arm of said first group, indicia located in relationship to said first movable arm for indicating under the condition of no relative movement thereof the approximate drift angle, means for supplying a signal corresponding to craft vertical displacement from a predetermined path of travel to one of said movable arms of said second group, means for supplying a signal corresponding to the algebraic sum of electrical magnitudes dependent upon said vertical displacement and deviation from a predetermined craft pitch to the remaining one of said movable arms of said second group, and said first group of movable arms being so oriented with respect to said second group that the navigator is directed to manipulate the controls according to the displacement of the point of intersection of the second pointer in the first group and the second pointer in the second group while being informed as to the resulting craft position according to displacement of the point of intersection of the first pointers in the two groups.

8. A flight indicating system for a craft comprising an indicator having a pair of signal-responsive exhibiting means, means for supplying a signal corresponding to craft displacement from a predetermined path of travel to a first one of said exhibiting means, and means for supplying a signal corresponding to the algebraic sum of magnitudes dependent upon said displacement and deviation from a predetermined craft heading to a second one of said exhibiting means.

9. The system of claim 8 including indicia located in relationship to said first exhibiting means for indicating under the condition of no relative movement thereof the approximate drift angle.

10. In a flight indicating system for a craft, a signal responsive visual flight indicator, means for supplying a signal thereto corresponding to the algebraic sum of factors dependent upon craft displacement from a predetermined path of travel and craft deviation from a predetermined orientation of the craft longitudinal axis and means for coordinating said factors so that said indicator reads zero both when said craft is on a predetermined flight path and proper heading to maintain said path, and if off said flight path when the pilot alters the heading in an amount and direction to cause said craft to approach its predetermined heading substantially asymptotically.

11. Craft progress indicating apparatus comprising an instrument having a face and first and second point defining means, said instrument being operable to produce deflection of the first and second points in any direction in said face, means coupled to said instrument for producing upward and downward deflection of the first point according to the vertical component of displacement of the craft from said path and for producing lateral deflection of the first point according to the horizontal component of displacement of the craft from said path, and means coupled to said instrument for producing upward and downward displacement of the second of said points according to the relative values of the variations of pitch of said craft and said vertical displacement from said path and for producing lateral displacement of the second point according to the relation between the angle of yaw in said craft from a predetermined heading and the lateral displacement of said craft from said predetermined path.

12. Craft progress indicating apparatus comprising an instrument having first and second indicia deflectable in corresponding directions thereof, means for producing a first signal varying according to the displacement of said craft from a predetermined path, means for producing a second signal varying according to the angular displacement of the longitudinal axis of said craft from a predetermined orientation, means for deflecting the first of said indicia from a neutral position in direction and extent according to the magnitude of said first signal, and means for deflecting said second indicium in direction and extent according to the magnitude of the difference between said first and second signals.

13. Apparatus as defined in claim 12 wherein said first signal producing means comprises a radio instrument landing glide path receiver and said signal producing means comprises a stable reference means and pitch-responsive pick-off means coupled thereto.

14. Apparatus as defined in claim 12 wherein said first signal producing means comprises a radio instrument landing localizer receiver and said second signal producing means comprises direction reference apparatus for producing an output voltage varying according to variations of heading of the craft from a predetermined heading.

15. In a flight indicating system for dirigible craft, the combination of; a meter having a face with an index, an indicator movable relative to the index, means for moving said indicator; first signal means for providing an output in accordance with the angle of pitch of the craft, second signal means for providing an output in accordance with displacement of the craft from a radio glide path, and means for combining said first and second outputs to control said indicator moving means so that said pointer remains in its centralized position not only when the craft is on the predetermined glide path and attitude, but also when its attitude is changed through an angle which decreases with displacement so as to return the craft to the glide path in a generally asymptotic fashion.

16. A cross-pointer meter for aircraft having a face with a reference position, a vertical pointer movable to the right and left of the reference position, means for so moving the vertical pointer, a horizontal pointer movable above and below the reference position, means for so moving the horizontal pointer; first signal means for providing an output in accordance with turning of the craft from a predetermined course, second signal means for providing an output in accordance with the lateral displacement of the craft from a selected radio path, combining means for said first and second means operatively connected to said vertical pointer moving means, a third signal means for providing an output in accordance with the angle of pitch of the craft, a fourth signal means for providing an output in accordance with the departure of the craft from a selected radio glide path, and means for combining said third and fourth signal means to control said horizontal pointer moving means.

17. A cross-pointer meter for aircraft comprising normally vertical and horizontal pointers, signal responsive means for moving the former right and left, signal responsive means for moving the latter up and down, course and attitude devices on the craft for supplying signals upon departure of the craft from a selected course and attitude, radio receivers on the craft supplying signals upon departure of the craft from a selected radio path in azimuth and elevation, said first signal means being controlled from a combination of the course and azimuth radio signals and the second signal means being controlled from a combination of the pitch attitude and elevation radio signal.

18. In a visual flying aid for dirigible craft, the combination of; a meter having a face with an index thereon, an indicator movable to the right and left of the index to indicate to the pilot the need of making a correction in the heading of the craft and its approximate amount and direction, means for moving said indicator including first signal means providing a reversible output in accordance with the magnitude and direction of lateral displacement of the craft from a radio path, second signal means for providing a reversible output in accordance with departure of the craft from a predetermined heading in magnitude and direction, and means for combining said first and second outputs to control said indicator moving means so that said indicator remains in its central or zero position not only when the craft is on said radio path with correct heading, but when off said path, as soon as the pilot turns the craft to approach the same at a predetermined angle which decreases as said path is approached.

19. A visual flight indicating instrument for aircraft having an indicator normally centralized on an index, means tending to displace said indicator up and down upon departure of the flight path above and below the radio glide path an amount proportional to such departure and other means also tending to displace said indicator up and down upon pitch of the craft down and up proportional to the pitch angle, the resultant displacement of said indicator being the difference of said two means.

20. A flight instrument as claimed in claim 19, in which said two displacing means are so interrelated that said indicator is centralized not only when said craft is flying on the glide path beam and at a proper attitude, but is also centralized when said craft is off the beam but pitched at the proper angle to return it to the beam substantially asymptotically.

21. In a visual flight indicating instrument for aircraft having a compass, and a radio course guidance device, an indicator normally centralized with reference to an index, means for displacing said indicator to the right and left thereof upon relative turning of the craft and its compass proportional to the amount of such turning and other means for also displacing said indicator to the right or left upon departure of the craft from its radio course proportionally to such departure, the resultant displacement of said indicator being the difference of said two means.

22. In a flight indicating system for a craft, a signal responsive visual flight indicator, and means for supplying a signal thereto corresponding to the algebraic sum of factors dependent upon craft displacement from a predetermined path of travel and craft deviation from a predetermined orientation of the craft longitudinal axis, said first factor being furnished by a radio-receiver responsive to a radio glide path beam and giving a reversible output of a sense and magnitude dependent upon the direction and amount of departure of the craft from the indicated glide path, and the second factor being furnished by a gyro-horizon giving a reversible output of a sense and magnitude dependent upon the direction and amount of pitch of the craft from its selected attitude.

PERCY HALPERT.

REFERENCES CITED

The following references are of record in the file of this patent:

UNITED STATES PATENTS

| Number | Name | Date |
|---|---|---|
| 2,119,530 | Dunmore | June 7, 1938 |
| 2,122,091 | Davies | June 28, 1938 |
| 2,208,379 | Luck | July 16, 1940 |
| 2,264,726 | Stickney | Dec. 2, 1941 |
| 2,296,041 | Luck | Sept. 15, 1942 |
| 2,340,282 | Dingley | Jan. 25, 1944 |
| 2,372,185 | Wittkuhns | Mar. 27, 1945 |
| 2,400,232 | Hall | May 14, 1946 |
| 2,423,337 | Moseley | July 1, 1947 |
| 2,476,301 | Jenks | July 19, 1949 |

FOREIGN PATENTS

| Number | Country | Date |
|---|---|---|
| 516,567 | Great Britain | Jan. 5, 1940 |
| 538,030 | Great Britain | July 17, 1941 |